O. C. HOUGHTON.
MOTOR DRIVEN VEHICLE.
APPLICATION FILED SEPT. 6, 1917.

1,270,826.

Patented July 2, 1918.
9 SHEETS—SHEET 1.

WITNESSES:
JStark
CM. Stark.

INVENTOR:
ORLEY C. HOUGHTON,
BY Michael J Stark & Sons
ATTORNEYS.

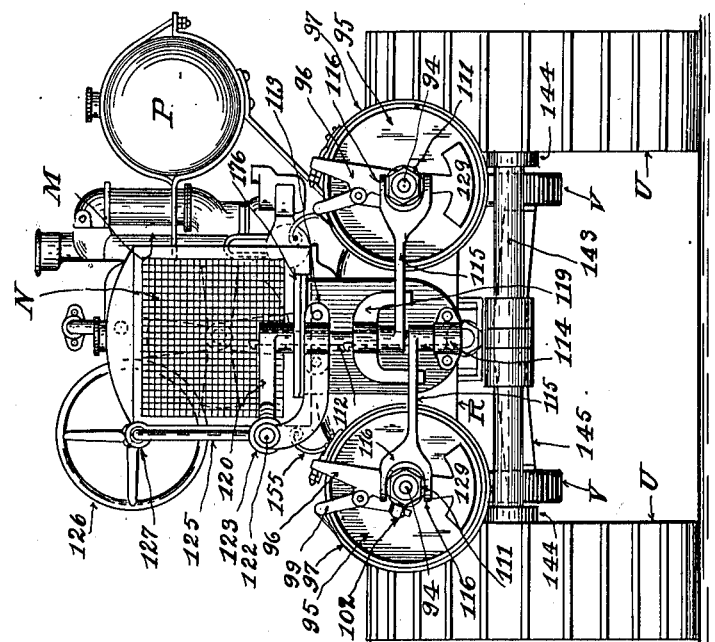

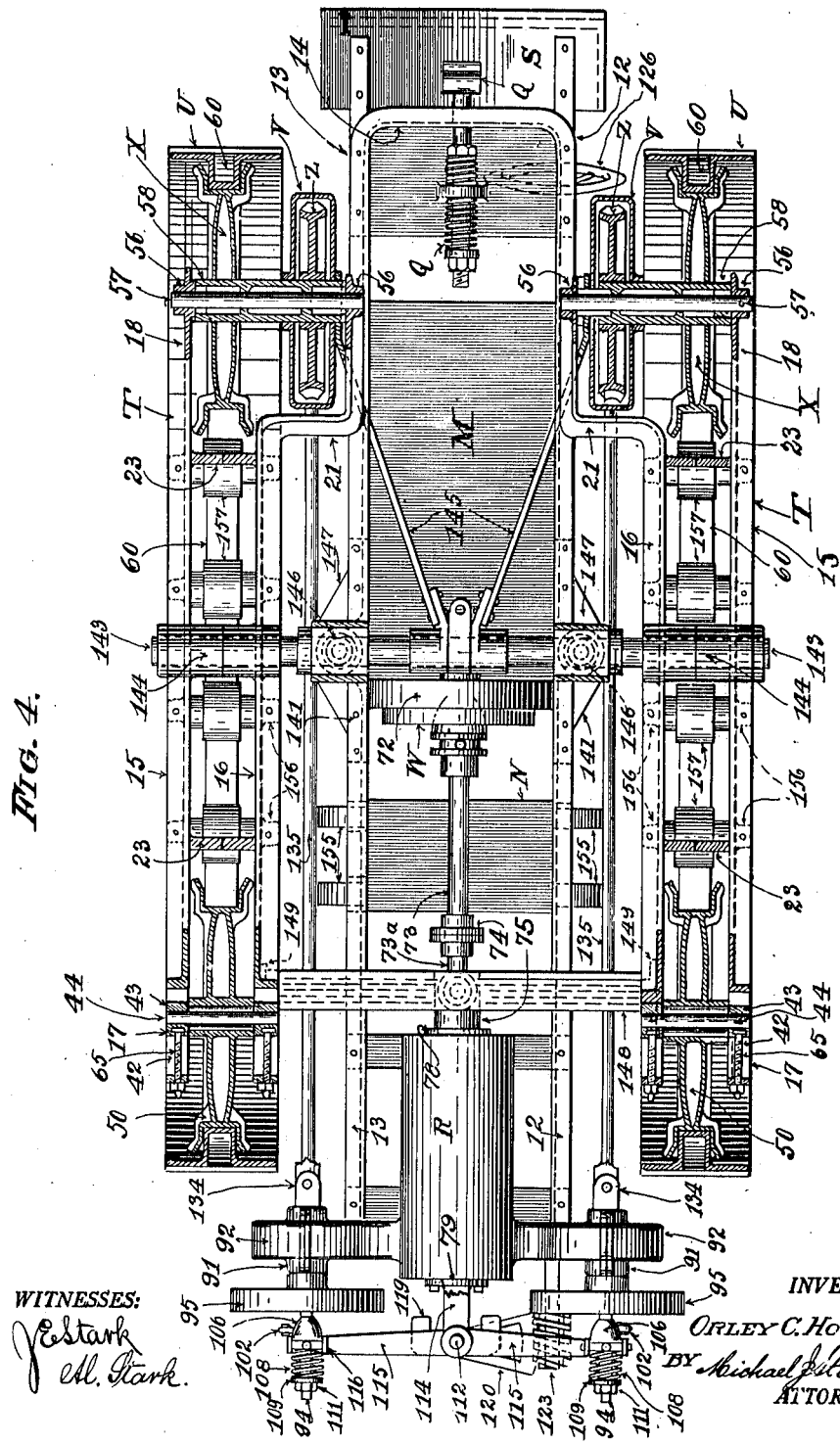

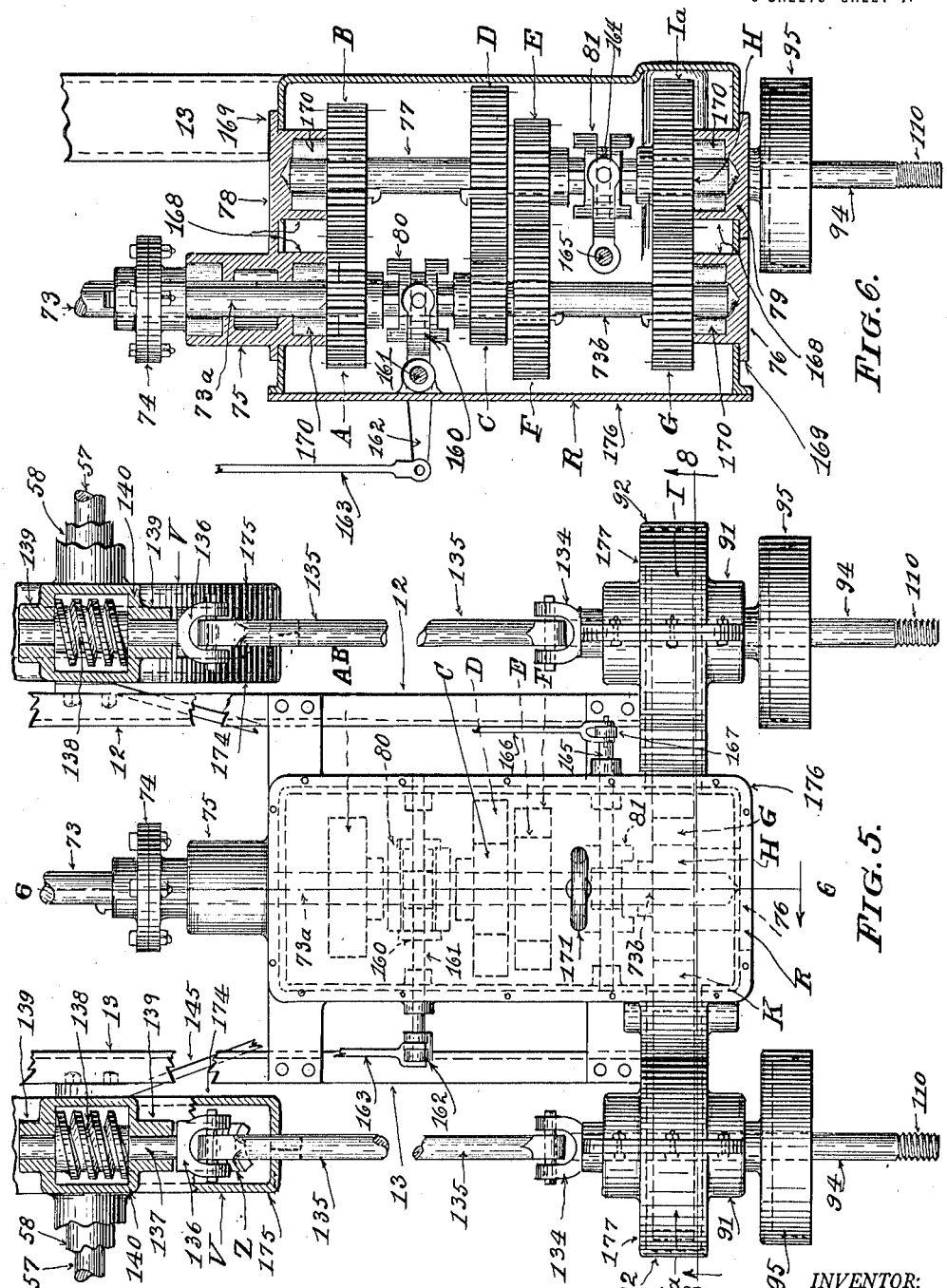

O. C. HOUGHTON.
MOTOR DRIVEN VEHICLE.
APPLICATION FILED SEPT. 6, 1917.

1,270,826.

Patented July 2, 1918.
9 SHEETS—SHEET 5.

WITNESSES:

INVENTOR:
ORLEY C. HOUGHTON
BY
ATTORNEYS.

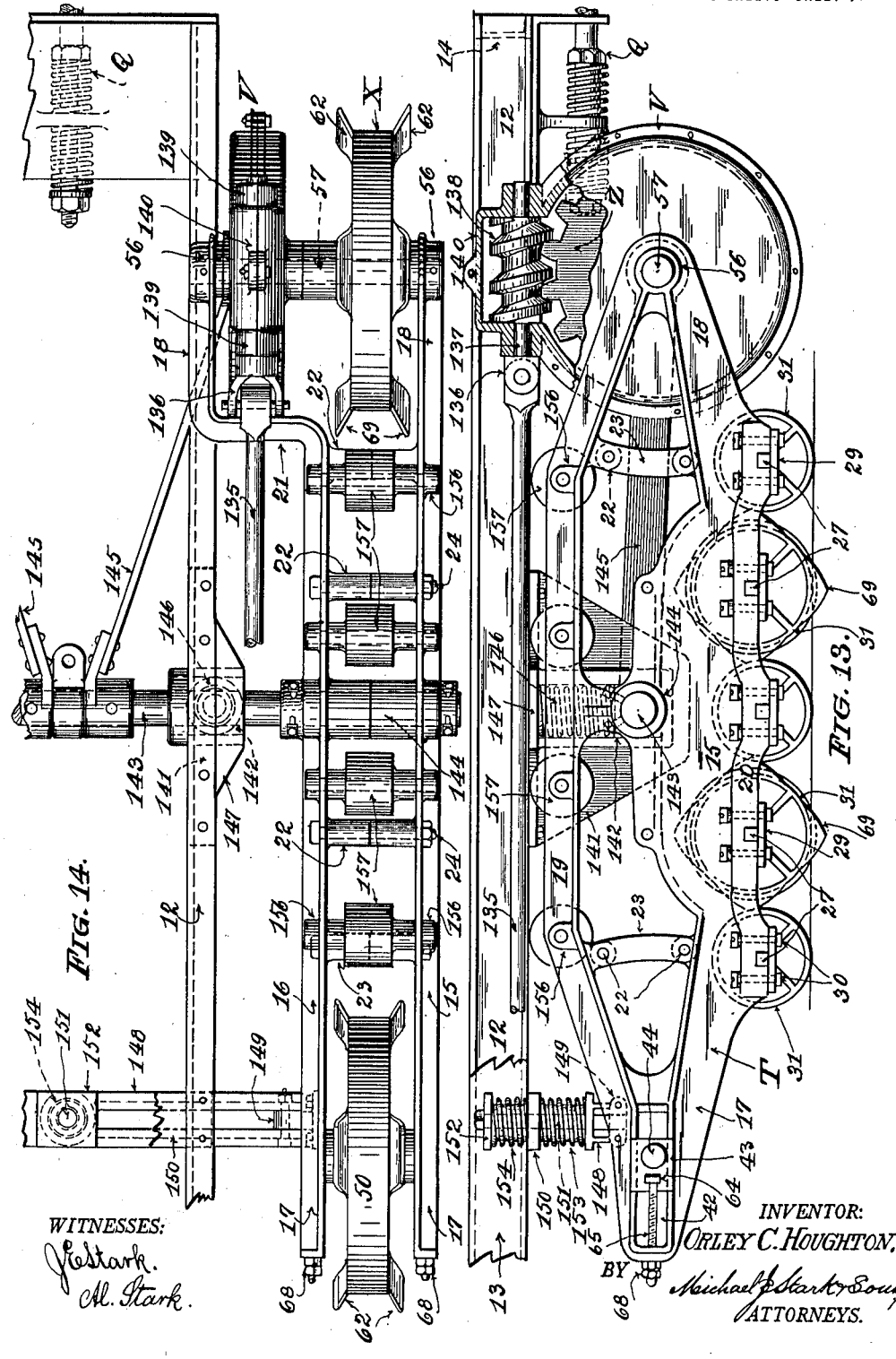

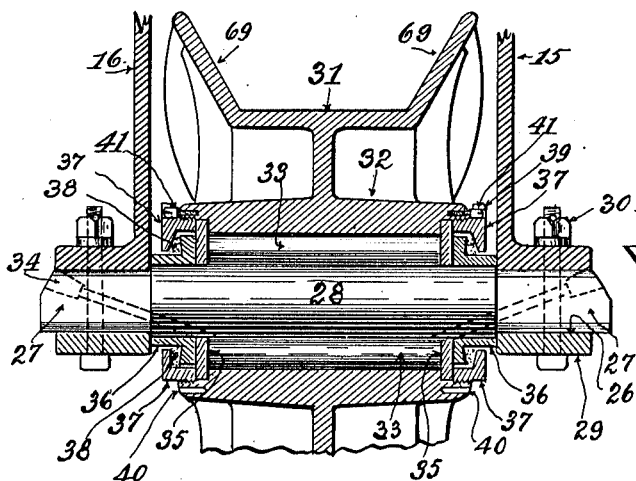

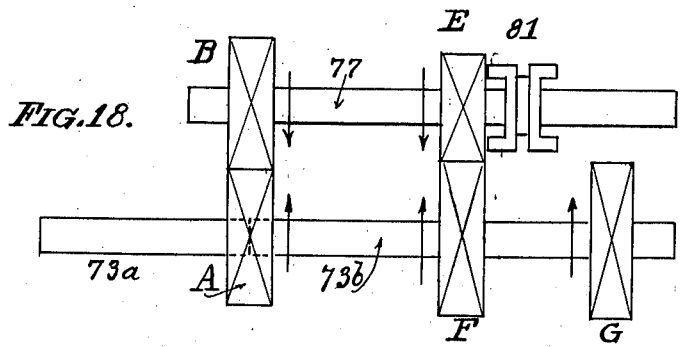
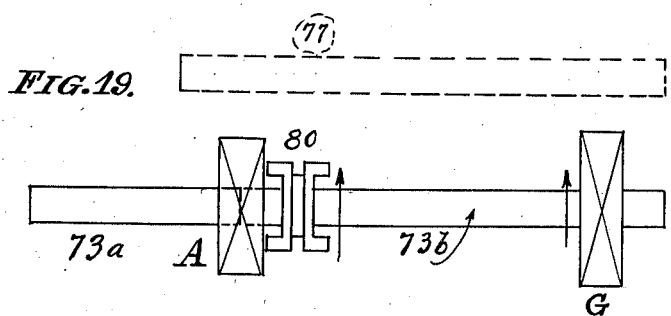
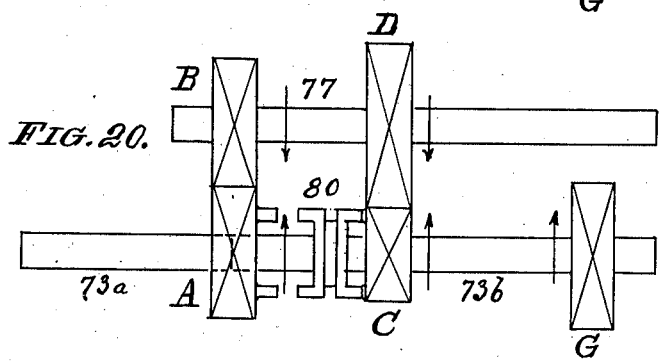
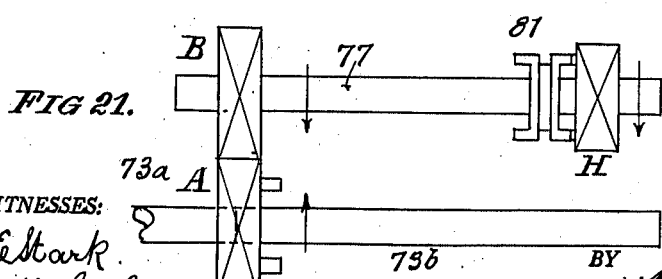

UNITED STATES PATENT OFFICE.

ORLEY C. HOUGHTON, OF CHICAGO, ILLINOIS, ASSIGNOR TO FREDERICK C. AUSTIN, OF CHICAGO, ILLINOIS.

MOTOR-DRIVEN VEHICLE.

1,270,826.

Specification of Letters Patent.

Patented July 2, 1918.

Application filed September 6, 1917. Serial No. 189,925.

*To all whom it may concern:*

Be it known that I, ORLEY C. HOUGHTON, a citizen of the United States, and a resident of the city of Chicago, in the county of Cook and State of Illinois, have invented a certain new and useful Improvement in Motor-Driven Vehicles; and I do hereby declare that the following description of my said invention, taken in connection with the accompanying sheet of drawing, forms a full, clear, and exact specification, which will enable others skilled in the art to which it appertains to make and use the same.

My invention relates generally to improvements in motor driven vehicles; and it consists, essentially, in the novel and peculiar combination of parts and details of construction, as hereinafter first fully set forth and described and then pointed out in the claims.

The object of this invention is the production of an efficient, serviceable, and durable traction engine, preferably of the endless track type, which can be successfully operated in the field, on the farm, on streets, etc., and which is especially well adapted for military purposes.

Figure 1:
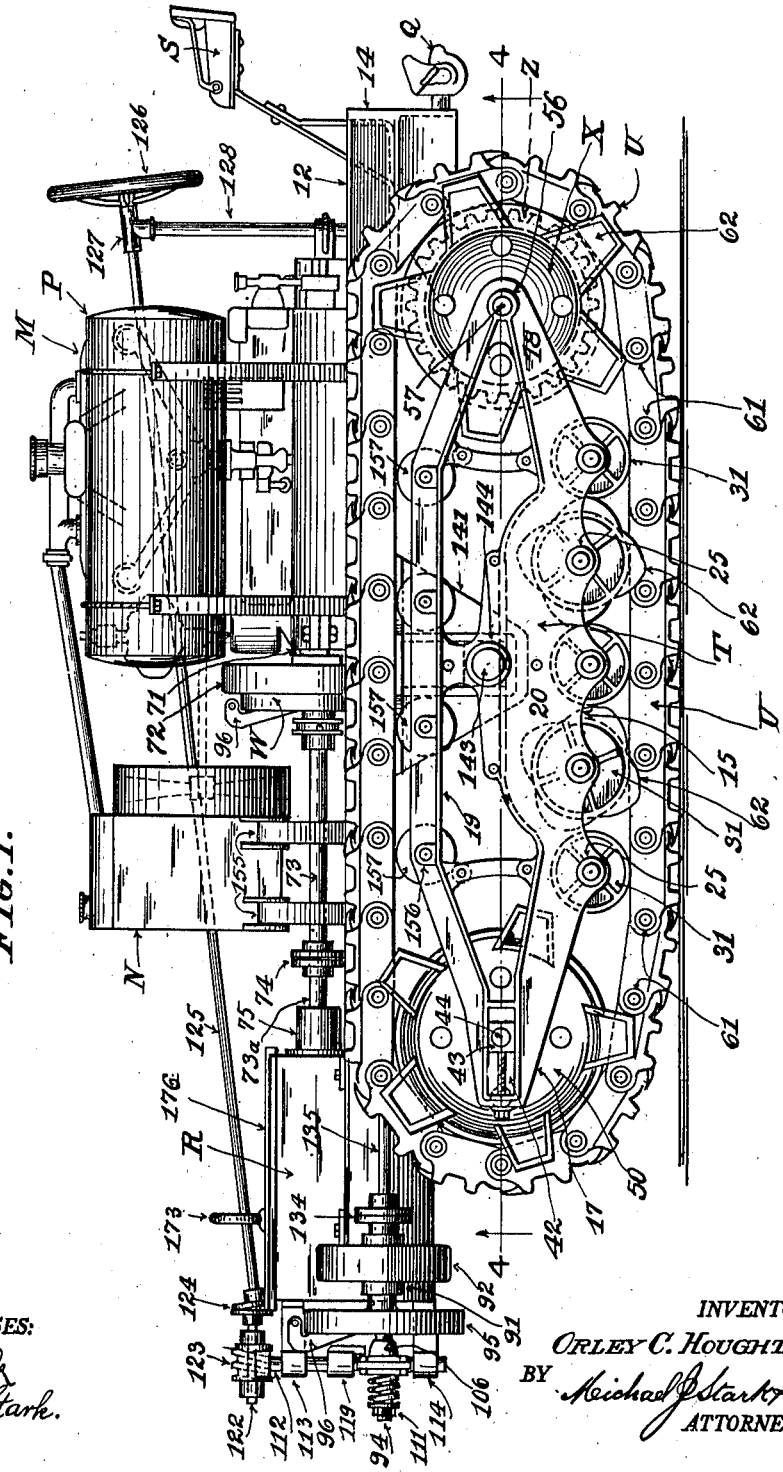
Figure 7:
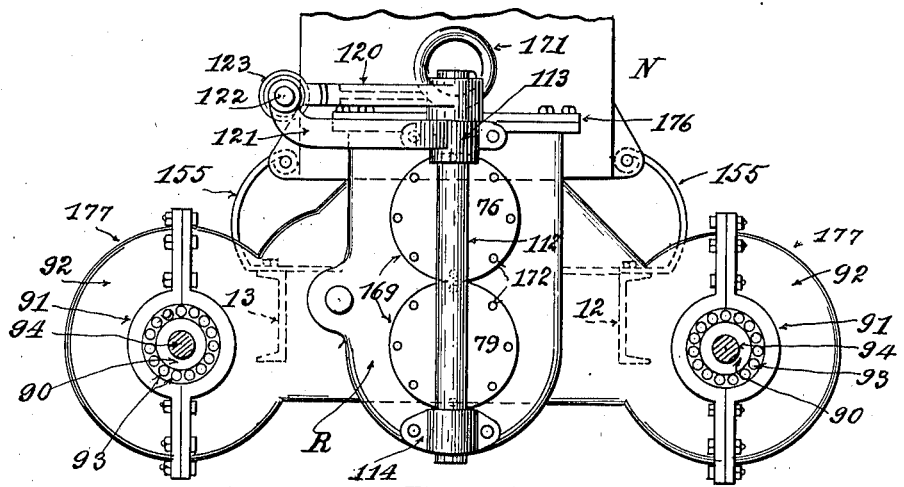
Figure 8:
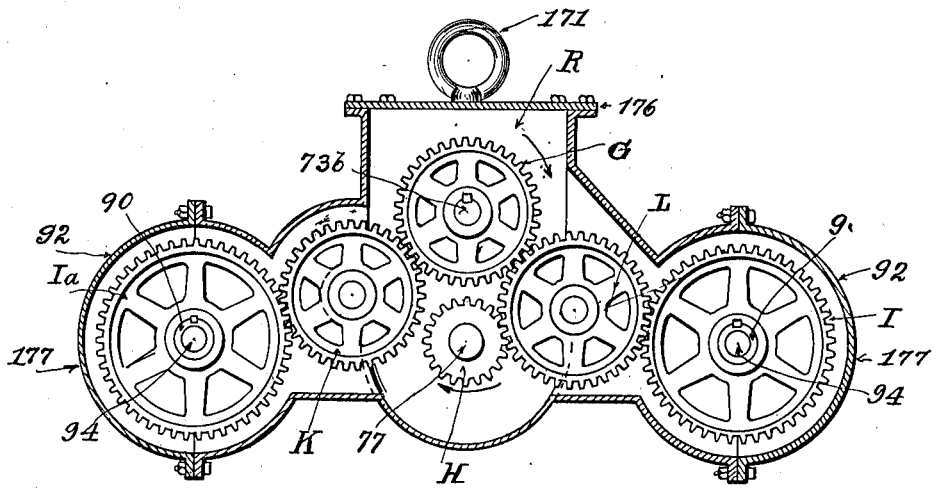
Figures 9, 10:
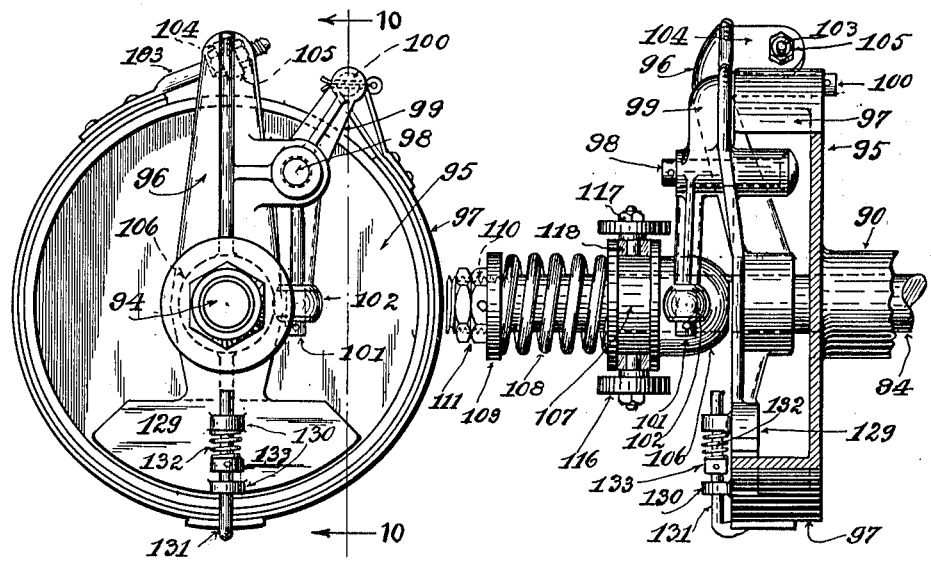
Figures 11, 12:
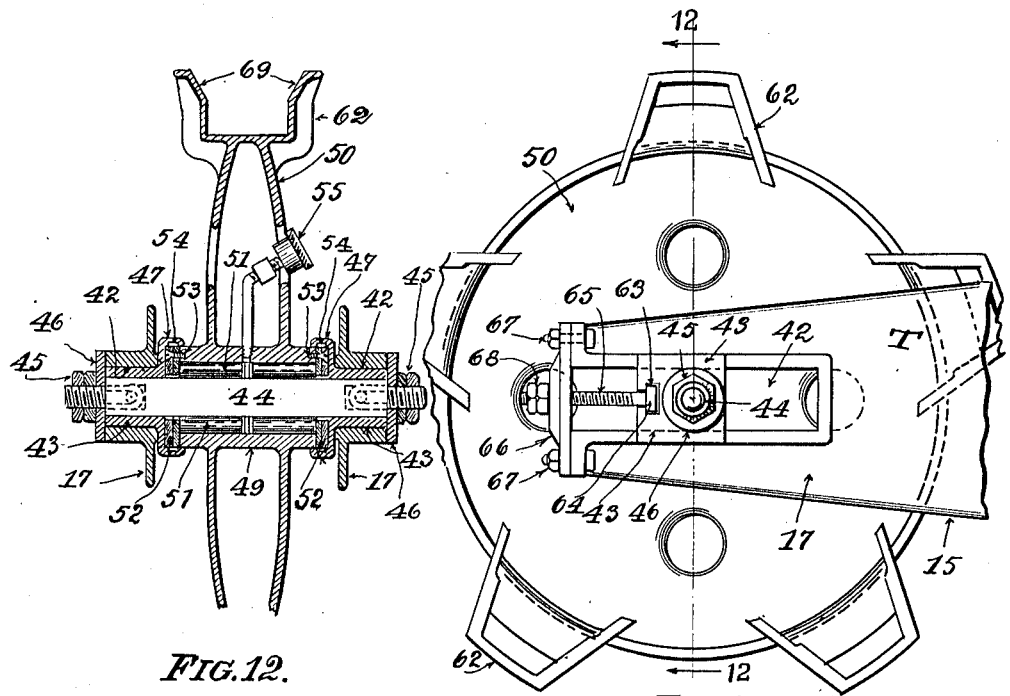

In order to accomplish these results, I construct this traction engine as shown in the drawings, forming a part of this specification, in which Figure 1 is a side elevation of this tractor. Fig. 2 is a rear elevation of the same, the operator's seat, and other minor details shown in other figures being omitted. Fig. 3 is a front elevation of the machine. Fig. 4 is an inverted sectional plan on line 4—4 of Fig. 1. Fig. 5 is a plan of the forward part of the machine, and a partial sectional view of the worm-gear case. Fig. 6 is a sectional view on line 6—6 of Fig. 5, showing, in detail, the transmission gearing. Fig. 7 is a front elevation of the transmission gear case. Fig. 8 is a sectional elevation of the same on line 8—8 of Fig. 5. Fig. 9 is an elevation of the clutch employed in this machine. Fig. 10 is a sectional view of the same on line 10—10 of Fig. 9. Fig. 11 is an elevation of one of the driving sprockets over which the endless track band is trained. Fig. 12 is a sectional view of the same on line 12—12 of Fig. 11. Fig. 13 is an elevation of a part of the truck, the driving, and idler sprocket wheels, the endless track band, and the operator's seat being omitted. Fig. 14 is a plan of the same, the track-wheels or rollers being omitted. Fig. 15 is an elevation of a fragment of the truck; and Fig. 16 is a sectional view of the same, on line 16—16 of Fig. 15. Fig. 17 is a fragmental plan of the truck showing the driving sprocket wheel and the worm gear wheel in horizontal section. Figs. 18 to 21 inclusive are diagrammatic views of the various transmission gear combinations by which three forward, and one backward speed of the machine are produced.

Like parts are designated by the same characters and symbols of reference in all the various figures.

This machine comprises a main frame or chassis which is formed of two, preferably channel, bars 12, 13, which are connected at their rear ends as shown at 14, thereby forming a structure resembling the letter U; and upon this main frame there is mounted an, preferably internal combustion, engine of the multiple cylinder type M, with all of its appurtenants, a radiator N, a water tank P, a transmission gear case R, an operator's seat S, and other minor parts, not shown, but required in an organized machine, which parts are of usual and well-known construction.

This main frame with its before-mentioned parts are supported upon trucks T, on which there are mounted endless track bands U, on which the machine is constructed to move or travel. These trucks of which there are two, viz., one on each side of the machine, are alike in construction, so that a description of one of these trucks applies with equal force to the other truck.

The main portion of this truck comprises two metallic, open, frames or skeletons 15, 16, in parallel spaced relationship, each skeleton having V-shaped ends 17, 18, the upper limbs of which are connected by a bar 19, while the lower limbs are connected by a bar 20. The outer member 15 of this skeleton frame is straight; but the rear end of the inner member 16 is offset, as at 21, to afford space for a worm gear case V, between the members 15, 16. These two members are provided with inwardly extending tubular bosses 22, and bars 23, there being in the tubular bosses bolts 24, best seen in Fig. 14, by which the members 15, 16, are securely fastened together.

In the lower margins of the lower bar 20 of the skeleton frame there are bearings 25, Fig. 1, in which the shafts of rollers or track wheels are rotating in the usual manner. But in the preferred embodiment of my invention, these bearings are of peculiar construction. As shown in Figs. 13, 15, and 16, the lower margins of each member 15, 16, are notched, preferably with square notches 26, and in these notches there are located the squared ends 27 of axles 28, which are rigidly held in non-rotating condition by clamping plates 29, and bolts 30. Roller, or track wheels 31, are mounted on these axles in a peculiar manner, as follows:

The hub 32 of each track wheel, as best seen in Fig. 16, is bored considerably larger than the diameter of the axle to afford space for antifriction rollers 33, which may be lubricated by oil grooves 34. The bore at the ends of the hub is enlarged, and upon the axle 28 there are forced collars 35, to keep the antifriction rollers in place. When thus far assembled, flanged collars 36, are forced onto the axle at each end thereof. The enlarged bores at the ends of the hub are internally screw-threaded, and into these enlargements are screwed followers 37, thereby leaving between the inwardly extending flanges of the followers and the outwardly extending flanges of the collars 36, annular spaces 38, which are filled with suitable absorbent packing, and thereby prevent escape of the lubricant. The outer peripheries of the followers 37 are polygonal in contour, as clearly illustrated in Fig 15, and provided each with a notch 39, while in the ends of the hub 32 there are a series of holes 40, wherewith a screw 41 engages, the head of which screw occupies the notch 39, and prevents the follower from rotating. By removing this screw the follower may be rotated to compress the packing in the space 38, and then again locked in position by replacing said screw 41 in the nearest hole 40. The important advantage gained by the construction just described is that the entire track wheel can be completely assembled at the works and then placed in position in the truck without any further assembling than to place the squared ends of the axles into the square notches and apply the clamps and screws to hold the axles in position.

The forward ends 17 of the truck frame members are slotted as at 42, best shown in Figs. 11 and 12, and in each of these slots there is mounted a box 43, to receive a non-rotating axle 44, the ends of which are reduced in diameter and externally screw-threaded to receive locking nuts 45, and flanges 46, to securely hold the axle 44 in non-rotating position. The boxes 43 have at their inner ends annular collars 47, provided with rims 48, which overlap the ends of the hubs 49, of the idler sprocket wheel 50. This hub is bored larger than the diameter of the axle 44, to afford room for antifriction rollers 51, which are held in position by collars 54, secured to the ends of the hubs by screws 53. The rims 48 of the collars 47 are internally grooved to receive packing 52 which prevents escape of lubricant supplied to the axle 44 by a lubricator 55, of any well-known construction, preferably by what is technically known as a grease cup.

The rear ends of the skeleton frame members 15, 16, terminate in substantial tubular bosses 56, bored to receive a non-rotating axle 57, best illustrated in Fig. 17 on which axle there is rotatably mounted a tube 58, the bore of which is large enough to receive at its ends antifriction rollers 59; and upon this tube, and near the outer end thereof, there is securely affixed a driving sprocket wheel X, to which reference will hereinafter be specifically had. This tube is, preferably, formed integral with a gear worm wheel Z, by which the driving sprocket wheel X is rotated.

Over the driving sprocket wheel X and the driven sprocket wheel 50, there is trained an endless track band U, which track band may be of any desired and approved construction. This track band forms no part of my present invention, so that a detailed description is omitted. Generally speaking, it is formed of pivotally connected members having a flat track 60, Fig. 4, provided with sidewise extending bosses 61, which bosses are engaged by sprocket teeth 62, extending radially from the flanks of the sprocket wheels. Slack in these endless track bands U is taken up by mechanism best illustrated in Fig. 11. The boxes 43 at the forward ends of the truck frames have T-slots 63, which receive the heads 64, of adjusting screws 65, which pass through end-plates 66, bolted to the ends of the frame members 17, by screws 67; locking nuts 68 being provided on the bolts 65 by which adjustment of the boxes, and through them, of the endless track bands may be effected in an obvious manner.

The sprocket teeth 62 on the driving sprocket wheel X have outwardly flaring flanges 69, and the teeth 62 with their inner, parallel flanks 70, engage the sides of the track 60, the flaring portions guiding the track to the sprocket wheels to prevent lateral or swinging movement of the track bands. And for a like purpose, the idler sprocket wheel 50, as well as one or more of the track wheels 31 are provided with these sprocket teeth 62, and the outwardly flaring flanges 69.

The motor of this machine is longitudinally mounted on the chassis with its crank shaft 71 in the longitudinal center line of the chassis. This crank shaft carries a fly wheel 72, and adjacent this fly wheel, a friction clutch W, preferably of a type hereinafter to be fully described. By means of this friction clutch, the crank shaft is connected to a main transmission shaft 73, to which is connected, by a coupling 74, a continuation 73$^a$, which latter shaft is journaled in bearings 75, at its outer end, and terminates at its inner end in the clutch gear wheel A, into the hub of which a second extension 73$^b$, enters. In the transmission gear case R there is mounted a countershaft 77, journaled in bearings 78, 79, and upon these shafts 73$^a$ and 77 there are mounted the transmission gearing, as follows:

Keyed to, or preferably formed integrally with, the shaft-extension 73$^a$, there is the clutch gear wheel A, above mentioned, and upon the countershaft 77 there is keyed a gear wheel B, the countershaft 77 being journaled in bearings 78, 79 bolted to the gear case R. Upon the countershaft 77 there is, furthermore, keyed a gear wheel D, which meshes with a clutch gear wheel C, loosely mounted on a second extension 73$^b$, and adjacent this clutch gear wheel C, there is keyed upon the second extension 73$^b$, a gear wheel F, which meshes with a clutch gear wheel E, loosely mounted on the countershaft 77. Upon the second extension 73$^b$ there is also keyed a gear wheel G; and loosely mounted on the countershaft 77 there is a clutch gear wheel H.

In the forward part of the transmission gear case R, and in two side extensions 92, thereof, there are located, as illustrated in Fig. 8, two intermediate gear wheels K, L, the former meshing with the gear wheel G, and the latter with both, the gear wheel G and the gear wheel H, the intermediate gear wheels K, L, finally meshing with the gear wheels I, I$^a$. Between the clutch gear wheels A and C, there is splined on the second extension 73$^b$ a double-faced clutch element 80, preferably of the claw-type, which element, when moved by a forked lever 160, on a transverse shaft 161 mounted in the gear case R, may be caused to engage either the clutch gear wheel A or the clutch gear wheel C. At the outer end of this shaft 161 there is placed an arm 162, which is pivotally connected to a rod 163, which leads back to a suitable distance of the operator's seat, so that the operator may manipulate the clutch element 80 in a convenient manner. Between the clutch gear wheels E and H, there is splined upon the countershaft 77, a second clutch element 81, which clutch element 81 is manipulated by a fork 164, on a shaft 165, having at its outer end an arm 167, to which is pivoted a rod 166, which likewise reaches back to be operated by the operator mounted on the seat S. By means of this arrangement of gearing and clutches I am enabled to move the machine forward at three different speeds, and backward at one speed; and in Figs. 18 to 21 inclusive, I have diagrammatically depicted the various combinations of gearing by which I attain these movements and speeds. Thus, in Fig. 18, I illustrate the combination by which I attain the slowest movement.

Assume that the first extension 73$^a$ rotates clutch gear wheel A, and that clutch gear wheel A rotates gear wheel B, and by it, the countershaft 77: when the clutch element 81 engages the clutch gear wheel E, this gear wheel will rotate gear wheel F, and with it the second extension 73$^b$, and thereby rotate the gear wheel G, as a driver, and G will then move intermediate gear wheels K, L, and these, in turn, rotate gear wheels I and I$^a$.

To attain a medium speed, which is probably the speed mostly employed, and has, therefore, the least number of gear wheels in action, I employ, as shown in Fig. 19, the clutch element 80 to connect the second extension 73$^b$, to the clutch gear wheel A so that gear wheel G, rotated by 73$^b$, again becomes a driver, the clutch element 81 being in neutral position shown in Fig. 6.

For the high speed, I use the combination shown in Fig. 20, in which case clutch element 80 engages the clutch gear wheel C. Thus A rotates B; 77 rotates D; D rotates C, which through clutch element 80 rotates 73$^b$, and this rotates G. The direction of movement of the various gear wheels is indicated by arrows, and shows that in all of these three instances cited, gear wheel G rotates in the same direction.

To reverse the movement of the vehicle, I avail myself of the combination shown in Fig. 21. Here the clutch element 81 engages the clutch gear wheel H, (the clutch element 80 being in neutral position) hence: A rotates B; B rotates 77, and through the clutch element 81 rotates H. By reference to Fig. 8, it will now be noted that G rotates clockwise, and H rotates in the same direction; and that when G effects the forward movement of the vehicle H when rotating counter clockwise, as illustrated in Fig. 13, will cause a retroactive movement thereof. In this connection I may state that the bearings 75, 76, 78, and 79, in which the shafts 73$^a$ and 73$^b$, and the countershaft 77 are journaled, comprise, as shown in Figs. 6 and 8, each a tubular hub 168, having a laterally extending flange 169, by which, and screws 172, Fig. 7, these bearings are secured to the forward and rear faces of the transmission gear case R, the hubs being bored large enough to receive antifriction rollers 170, to reduce friction as much as possible. And in order to permit of the insertion into, and the removal of the transmission gearing out of, the transmission gear case, the latter is provided with a cover 176, bolted to the gear case, while the extensions 92 thereof have their outer halves 177, bolted to the main portion of said extensions.

This transmission gear case with all of its contained elements may be assembled at the works, and in its complete condition may be placed onto the chassis; a ring 171, on the cover of the gear case R being provided by which to handle the same by any suitable hoisting mechanism.

Inasmuch as the worm wheels Z are subjected to wear, and may require renewal, I form these worm wheels in sections, as illustrated in Fig. 17. Thus, the tube 58 has formed thereon a web 172; and to this web is secured a, preferably steel, ring 173, the periphery of which is provided with the worm wheel cogs; and in order to insert and remove these worm wheels, the worm wheel gear case is formed in two sections, the portion 174 being suitably bolted to the section 175, as clearly shown in Fig. 17.

Gear wheels I, I$^a$, are keyed to sleeves 90, Figs. 6, 7, and 8, which sleeves rotate in bearings 91, in the side extensions 92 of the transmission gear case R; antifriction rollers 93 being placed into the bearings 91. These sleeves are mounted loosely upon short shafts 94, which shafts are, however, only indirectly rotated in the following manner:

The shafts 94 extend forwardly from the side extensions of the gear case for some distance. The sleeves 90 have on their outer ends drums 95, formed, preferably integrally with, the sleeves; and these drums or pulleys communicate rotative movement to the shafts 94, by means of a friction clutch device, which, describing it in the singular number, comprises an arm 96, extending beyond the periphery of the drum 95. This arm is fixed to shaft 94. Upon the periphery of the drum 95 there is placed a brake band 97, Figs. 9 and 10. From the arm 96, and pivoted thereto by a pin or bolt 98, extends a lever 99 having at its upper end a bolt 100, and at its opposite end a pin 101, on which there is mounted a roller 102. One end of the brake band 97 is secured to the pin 101, and the other end thereof is secured to a screw rod 103, passing through a lug 104 formed on the back, and at the upper end of the arm 96; lock nuts 105, being provided on said rod, for adjustment of the tension of the brake band, in an obvious manner.

Upon the shaft 94 there is mounted a cone 106, on the periphery of which roller 102 is caused to rotate slightly, said cone 106 being provided with an extension having a circumferential groove 107; and in front of this extension there is mounted on shaft 94, a spring 108, while in front of this spring there is a washer 109, and on the outside of this washer, there is placed, on the screw-threaded portion 110, Figs. 5 and 6, adjusting and locking nuts 111, by which the spring 108 may be properly tensioned. The cones 106 are laterally moved on the shafts 94 in one direction by means including, as best shown in Figs. 1, 4, and 7, a vertically disposed shaft 112, journaled in bearings 113, 114, secured to the forward face of the transmision gear case R. On this shaft 112, there are secured two arms 115, pointing in opposite directions, the outer extremities of which are bifurcated, as at 116, which forks have pins 117, fitted with rollers 118, that engage the grooves 107 in the cone-extensions. Approximately medially, between the bearings 113, 114, there is secured to shaft 112 an arm having downwardly extending members 119, one of which bears against one, and the other against the other, of the forked arms 115. Oscillating this forked arm 119, in one direction, causes the corresponding cone 106 to move in a direction away from the drum with which it is connected, while rotating the element 119 in the opposite direction, produces the same effect on the opposite cone. To rotate this vertical shaft 112, there is placed at its upper end a segment of a worm wheel 120; and laterally projecting from the upper bearing 113 of the shaft 112, there is a bracket 121, having bearing for a short shaft 122, on which there is formed a worm 123, which engages the segmental worm wheel 120. The short shaft 122 is coupled, by means of a flexible coupling 124, Fig. 1, to a shaft 125, extending rearwardly to a reasonable distance from the operator's seat S, and carrying at its rear end a hand wheel 126; the rear end of said shaft 125 being journaled in a bearing 127, provided at the upper end of a post 128, rising from the chassis of the machine.

It will now be noted that rotating the hand wheel in one direction produces the following result: The worm 123 engaging the segmental gear wheel 120, rotates the vertical shaft 112, and this, in turn, acting through the corresponding fork 119 on the correlated arm 115, draws the cone 106 in the direction away from the respective drum, and through the lever 99 slackens the brake band, more or less, and releases it from the drum 95. In this connection I will state that normally, the cones are in extended position shown in Fig. 10, where the arms and levers have pulled the brake band tightly onto the drum, so that any movement of the cones away from the drums causes the brake bands to slacken, the cones being forced to normal position by the springs 108 when all the parts on the vertical shaft 112 are in a like, normal position.

The tension of the springs 108 is so adjusted by the adjusting nuts 111, that the brake bands will receive just sufficient frictional energy from the brake drums to operate the track bands under normal conditions. Should, however, the machine meet an obstruction in the road which the friction clutches cannot overcome, which, in the usual driving mechanisms would stall the motor, the brake bands will slip on the drums so that no injury can happen to the machine, and allowing the obstruction to be removed without being compelled to restart the motor, the cranking of which is very objectionable. And in this connection it is opportune to state that, there being two operating shafts, one for each traction element, the strain or torque on these shafts is but one half of that to which chain, worm, or other driving mechanisms are subjected that have but a single operating shaft. And, furthermore, it will be observed that the worm drive as described places an equal strain on the trucks, and thereby avoids any twisting of the truck frames, and other troubles which it is not necesary to mention.

In order to make the release of the brake band from the friction drum 95 positively certain, I form on the counterweight 129, Figs. 9, and 10, (which is preferably formed integrally with the arm 96 to balance the same) punctured lugs 130, in which a rod 131 is movably arranged. To the lower end of this rod the brake band is secured. A spring 132, on, and a collar 133, fixed to, the rod 131, tend to push the brake band away from the friction drum 95. The effect of this spring 132 on the brake band is, however, overcome when the brake band is being tightened to the drum by the cone 106. It will now be noted that while the friction drum is rotating, the shaft 94 on which the arm 104 is fixed does not rotate until the cone 106 is forced, by the action of the spring toward the arm 104, thereby causing the lever 99 to tighten the brake band so that now the friction drum rotates the arm 104 with its lever 99, and through it, the shaft 94.

The shaft 94 passes through the extension of the transmission gear case R, and has, at its rear end, adjacent to the gear case extension, coupling 134, preferably of the universal type, and to this joint is connected an operating shaft 135, which is located at, and approximately parallel to, the side of the chassis, and which shaft connects, with a coupling 136, to a short shaft 137, formed preferably integrally with a worm 138, which worm engages the worm wheel Z heretofore mentioned. The worm shaft 137 is journaled in bearings 139, formed on an extension 140, on the worm wheel case V. This gear case is entirely closed to retain lubricant by which the worm gearing is lubricated, suitable means, not shown, being provided to introduce the lubricant to the worm gear case V.

It is obvious that, there being two trucks and two traction elements, the above description of the worm driving mechanism applies to both of these devices.

The two trucks T are supporting the entire superstructure of the machine, in the following manner:

Depending from the channel bars 12, 13, there are hangers 141, which are vertically slotted and have slidable boxes 142, operable in said slots, and are best shown in Figs. 13 and 14, in which boxes there is mounted a dead axle 143, transversely of the chassis, and extending from one side of the trucks T, to the opposite side thereof. The truck frame members have bearings 144, whereby these truck frames may oscillate on the dead axle and permit these trucks to follow the undulations of the ground over which the machine may pass. In order to maintain the parallelism of the two trucks, and to prevent twisting thereof, there are connected to the dead axle 143 converging brace rods 145, which reach back to, and embrace, the hubs of the worm gear cases, close to the truck frame members 21, as best disclosed in Fig. 17.

The superstructure of this machine is flexibly supported upon the trucks by locating coil springs 146, in the openings in the hangers 141, to bear at one end on the boxes 142, and at the other end on laterally extending flanges 147, of the hangers, while near the forward end of the machine a structure is located, including two angle bars 148, reaching from one to the opposite one, of the inner truck frame members, to which angle bars 148 are pivotally connected at their ends by lugs 149. Connecting the channel bars 12, 13, near their forward ends, there is a bar 150, Figs. 13 and 14, and in this bar there is suitably secured a vertically disposed bolt or rod 151, carrying at its upper end a plate 152. Interposed between the angle bars 148 and the plate 150, there are, preferably two, coil springs 153; and between this plate 150 and the plate 152, there are two more springs 154. Both of these sets of springs are under tension so that, should the truck frames rise at their forward ends, the springs 153 will act as shock absorbers, while when the forward ends of the truck frames descend from a normal or horizontal position, the springs 154 will perform the function of a shock-absorber, while the channel bars 148, in addition to serving as supports, act as flexible tie rods to the forward ends of the truck frames, permitting either of the forward ends of the truck frames to rise and fall, thereby preventing torsional stresses being set up in the structure.

In order to provide for connecting a trailer to the machine, there is located at the rear end of the machine a coupling Q, of any approved design.

The radiator N is flexibly supported upon the chassis by curved springs 155, to relieve the same from jars and jolts, which would seriously affect the delicate cellular structure thereof.

To support the upper runs of the endless track bands, there are provided in the upper bars 19 of the truck frames bearings 156, in which are journaled the shafts of carrying rollers 157, of any approved construction.

Attention is now directed to the fact that this machine has no steering wheels, and that the steering is entirely accomplished by manipulating or controlling the speed of the endless track bands, by the single hand wheel 126. Thus, when this hand wheel is slightly rotated in one direction, that track band which is controlled by this movement, will slacken its speed, and the other track band, having the preponderance of speed, will cause the machine to swerve from a straight course toward the right or the left, as the case may be; and it is to be noted that when one of the brake bands is caused to be entirely released from its drum, so that the track band controlled thereby stands still, the other track band being moving, it will cause the machine to turn in a circle the center of which is approximately in the middle of the track band that is not moving, thereby enabling this machine to turn the sharpest corners, and move in the most confined places, generally without being compelled to back up.

To facilitate this turning movement, the ground run of the endless track bands is slightly curved, as indicated in Fig. 1.

While I have hereinbefore mentioned traction engines as being the machines to which my invention is applied, I desire it to be understood that many, if not all, of the elements, and combinations of parts shown and described may be successfully employed in almost every motor vehicle, such as motor trucks, automobiles, twin-screw vessels, etc.; and while I have also described with considerable minuteness the preferred embodiment of my invention, I desire to state that I am aware that many of these details of construction disclosed, may be varied, and parts omitted without departing from the scope of my invention as defined in the subjoined claims.

Having thus fully described this invention, I claim as new, and desire to secure by Letters Patent of the United States—

1. In a power driven vehicle, the combination, of a chassis, a motor mounted on said chassis, a main transmission shaft connected to said motor, said main transmission shaft being located in the longitudinal center of said chassis, a transmission gear case at the forward end of said chassis, gearing in said transmission gear case connected to said main transmission shaft, a pair of driving shafts, one on each side of said chassis, a friction device at the forward end of each driving shaft, said friction devices being operated by said gearing, a worm at the rear end of each driving shaft, a pair of trucks, one on each side of said chassis, endless track bands mounted in said trucks, a driving sprocket wheel for each track band, and a worm wheel connected with each driving sprocket to rotate said driving sprocket, and mechanism for controlling the movement of each track band, said mechanism including a single hand wheel.

2. In a motor vehicle, the combination, of a chassis, a motor mounted on said chassis, a pair of trucks to support said chassis, endless track bands mounted in said trucks, and mechanism for controlling the speed of the track bands, including a pair of operating shafts in parallel spaced relationship, said operating shafts being located, one on each side of the chassis and reaching from the forward end thereof to near the rear end of the machine, a worm wheel driving mechanism at the rear ends of the said operating shafts, each shaft being operatively connected to its correlated track band, a friction device at the forward end of each operating shaft, each of said friction devices being connected to said motor, and means including a single operating mechanism for controlling said friction devices.

3. In a motor vehicle, the combination, of a chassis, a motor mounted on said chassis, a transmission gear case located at the forward end of said chassis, transmission gearing in said gear case, said gearing being operatively connected to said motor, two operating shafts located one on each side of said chassis and extending through said transmission gear case, said operating shafts being connected to said gearing, a pair of friction drums one on each side of said gear case and rotatably mounted therein, means connected to said operating shafts for engaging said friction drums, whereby said friction drums are constructed to rotate said operating shafts.

4. In a motor vehicle, the combination, of a chassis, a motor mounted on said chassis at the rear end thereof, a transmission gear case at the forward end of said chassis, transmission gearing in said gear case, said gearing being operatively connected to said motor, two operating shafts located one on each side of said chassis, said operating shafts extending through said transmission gear case, said operating shafts being connected to said gearing, a pair of drums one on each side of said gear case and rotatably mounted therein, means connected to said operating shafts for engaging said drums to operate said shafts, traction means for said chassis, and gearing connecting said traction means to said shafts to independently operate said traction méans.

5. In a motor driven vehicle, the combination, of a chassis, a motor mounted on said chassis, a main transmission shaft connected to said motor, said main transmission shaft being located in the longitudinal center line of said chassis, a transmission gear case at the forward end of said chassis, transmission gearing mounted in said gear case, said gearing being connected to said main transmission shaft, two operating shafts, one on each side of said chassis, and means for connecting said operating shafts to said transmission gearing, the latter means including two drums rotatably mounted near the forward ends of said operating shafts, arms on each of said shafts and fixed thereon, a lever pivotally mounted on each arm, a band on the periphery of each of said drums, one end of said band being connected to said arm, the other end of said band being secured to said lever, and means for operating said levers to tighten said bands around said drums to rotate said arms.

6. In a motor driven vehicle, the combination, of a chassis, a motor mounted on said chassis, a truck at each side of said chassis, an endless track band movably mounted in each truck, and means for operating said endless track bands, said means including two worm wheel shafts, one on each side of said chassis, a worm at the rear end of each operating shaft, worm wheels in engagement with said worms, means connecting said worm wheels to said endless track bands, a transmission gear case at the forward end of said chassis, transmission gearing in said gear case, said transmission gearing being connected to said motor and to said operating shafts, the connection between said gearing and said operating shafts including a friction device at each of said operating shafts connected to said gearing.

7. In a motor driven vehicle, the combination, of a chassis, a motor mounted on said chassis, a truck at each side of said chassis, an endless track band movably mounted in each truck, means for operating said endless track bands, said means including two worm wheel shafts, one on each side of said chassis, a worm at the rear end of each operating shaft, worm wheels in engagement with said worms, means connecting said worm wheels to said endless track bands, a transmission gear case at the forward end of said chassis, transmission gearing in said gear case, said transmission gearing being connected to said motor and to said operating shafts, the connection between said gearing and said operating shafts including a friction device at the forward end of each operating shaft, and means on each operating shaft for disconnecting each friction device from said gearing independently of the other of said friction devices.

8. In a motor driven vehicle, the combination of a chassis, a motor mounted on said chassis at the rear end thereof, traction means at each side of said chassis, and means for connecting said motor to said traction means, said means including two operating shafts in parallel spaced relationship, each of said shafts being operatively connected to its correlated traction means, each of said operating shafts having at its forward end a friction device connected to said motor, and means for disengaging one of said friction devices from said operating shaft independently of the other of said friction devices.

9. In a motor driven vehicle, the combination, of a chassis, a motor mounted on said chassis, traction means at each side of said chassis, and means for connecting said traction means to said motor, including a transmission gear case at the forward end of said chassis, gearing in said transmission gear case, operatively connected to said motor, said gearing including a pair of gear wheels, said gear wheels being mounted on sleeves, rotatably mounted in said gear case, a drum on each sleeve and fixedly connected thereto, an operating shaft for each drum, said shafts passing through said sleeves, said sleeves rotating on said shafts, said shafts extending to within a short distance of the rear end of said chassis, the rear ends of said shafts being operatively connected to said traction means, an arm secured to the forward end of each shaft, a band around each drum, said arm being connected to said band to tighten the same around said drum, means for operating said arm to cause the engagement of said band with said drum, and means for releasing said bands independently of each other.

10. In a motor driven vehicle, the combination of a chassis, a motor on said chassis at the rear end thereof, traction means at each side of said chassis, and means for connecting said motor to said traction means, said means including a gear case at the forward end of said chassis, gearing in said gear case for operatively connecting said motor to said traction means, said gearing including a pair of gear wheels, said gear wheels being fixed to sleeves rotatably mounted in said gear case, a friction drum for each of said pair of gear wheels, a pair of operating shafts passing through said sleeves at their forward ends, and extending to within a short distance of the rear end of said chassis, the rear ends of said operating shafts being operatively connected to said traction means, an arm secured to the forward end of each operating shaft, a brake band surrounding each friction drum, a lever on each arm and pivotally connected thereto, said arm being connected to one end of said brake band, said lever being connected to the other end of said brake band, and means for operating said levers to cause said arms to engage said drums, the latter means including a cone at the forward end of each operating shaft, a vertically disposed shaft in front of said gear case, arms pivotally mounted on said vertical shaft, said arms being connected to said cones, a bifurcated element on said vertical shaft, the fork-members of which engage said pivotally mounted arms, and means for operating said bifurcated element.

11. In a motor driven vehicle, the combination, of a chassis, a motor mounted on said chassis, endless track bands at each side of said chassis, a gear case at the forward end of said chassis, transmission gearing in said chassis, an operating shaft at each side of said chassis, said shaft being operatively connected to said endless track bands and to said gearing, and means for rotating said operating shafts in unison, and at speeds varying from each other, the operative connection between said operating shafts and said endless track bands including a worm at the rear end of each operating shaft, a driving sprocket wheel for each track band, said driving sprockets being mounted on sleeves, said sleeves being rotatably mounted on axles, and a worm wheel on each sleeve and meshing with its coacting worm.

12. In a motor driven vehicle, the combination, of a chassis, a motor mounted on said chassis, traction means at each side of said chassis, and means for operating said traction means, said means including a gear case at the forward end of said chassis, gearing in said gear case connected to said motor, said gearing including a pair of drums, one on each side of said gear case, an operating shaft at each side of said gear case, said operating shafts being connected at their forward ends to said drums, and at their rear ends to said traction means, a single steering hand wheel, a vertically disposed shaft in front of said gear case, said vertical shaft being operatively connected to said hand wheel, friction-actuated means for connecting said operating shafts to said drums, means on said vertically disposed shaft for operating said friction-actuated means, said friction means being normally in operative connection with said drums, whereby by rotating said hand wheel, one or the other of said friction means will release one or the other of said operating shafts without affecting the other of said friction means.

13. In a motor driven vehicle, the combination of a chassis, a motor mounted on said chassis, traction means on each side of said chassis, and means connecting said motor to said traction means, including a gear case at the forward end of said chassis, gearing in said gears case connected to said motor, a friction drum at each side of said gear case and operatively connected to said gearing, an operating shaft at each side of said chassis, the forward ends of said operating shafts passing through said drums, the rear ends of said operating shafts being connected to said traction means, an arm at the forward end of each operating shaft, a lever on each arm and pivotally connected thereto, a friction band surrounding said drum, one end of said friction band being connected to said arm, the other end of said friction band being secured to said lever, a slidable cone at the forward end of each operating shaft, a roller rotatably mounted at the lower end of each lever, to engage said cone, a spring in front of each cone, for normally forcing said cone to tighten said band on said drum, and means for retracting said cones to cause said levers to release said bands from said friction drums.

14. In a motor driven vehicle, the combination, of a chassis, a motor mounted on said chassis at the rear end thereof, a traction means at each side of said chassis, and means for operating said traction means, said traction means including a pair of trucks, each truck comprising a pair of skeleton frames, a sprocket wheel at each end of said skeleton frames, an endless track band trained over said sprocket wheels, a dead axle transversely of, and located underneath said chassis and connected thereto and to each of said truck frames, carrying wheels for the upper runs of said endless track bands, and track wheels for the lower runs of said track bands, said track wheels having axles, the ends of said axles being squared, the lower margins of said skeleton frames being notched to receive the squared ends of said axles, and clamps to retain said axles in said notches, said sprocket wheels being rotated by worm gearing operatively connected to said motor.

15. In a motor driven vehicle, the combination, of a chassis, a motor mounted on said chassis, a pair of trucks, one at each side of said chassis, a pair of sprocket wheels mounted in each of said trucks, means for connecting said sprocket wheels to said motor, an endless track band trained over each pair of coacting sprocket wheels, said trucks comprising each a pair of skeleton frames, said frames being rigidly connected to each other, said skeleton frames having V-shaped ends, the upper bars of each V being integrally connected to each other by a bar, said latter bar having bearings, carrying rollers rotatably mounted in said bearings, said carrying rollers supporting the upper runs of said endless track bands, the lower members of said V's being connected by a bar, said bar having in its lower margin a series of notches, non-rotating axles, said non-rotating axles having squared ends engaging said notches, clamping plates for retaining said axles in said notches, track wheels rotatably mounted on said axles, said track wheels being constructed to run on the lower stretch of said endless track bands.

16. In a motor vehicle, the combination, of a chassis, a motor mounted on said chassis, and a pair of truck frames to support said chassis, said truck frames comprising each a pair of skeleton members, said skeleton members having at their lower margins angular notches, an axle in each notch, said axles having squared ends engaging said notches, clamping plates underneath said notches, bolts for securing said clamping plates to said skeleton members, and track wheels rotatably mounted on said axles.

17. In a motor driven vehicle, the combination, of a chassis, a motor mounted on said chassis, traction means at each side of said chassis, and trucks for supporting said chassis, said trucks comprising each two skeleton members, each of said members having V-shaped ends, the members of the V's being connected by horizontally disposed bars, there being formed at the opposing flanks of each skeleton member tubular bosses, said bosses being integrally formed with said members, bolts passing through said bosses, said bolt having nuts which, when tightened, will securely connect said members.

18. In a motor driven vehicle, the combination, of a chassis, a motor mounted on said chassis, traction means at each side of said chassis, and trucks for supporting said chassis, said trucks comprising each two skeleton members, each of said members having V-shaped ends, the members of the V's being connected by horizontally disposed bars, there being formed at the opposing flanks of each skeleton member tubular bosses reaching to within one half of the distance between opposing skeleton members, bolts passing through said bosses, nuts on said bolts which, when tightened will securely fasten the two skeleton members together, there being bearings at the apexes of the V's, the outer member of the skeleton frames being straight, the inner member of said skeleton being offset at one end, the driving mechanism for said traction means being located at the latter end.

19. In a motor driven vehicle, the combination, of a chassis, a motor mounted on said chassis, traction means at each side of said chassis, and trucks for supporting said chassis, said trucks comprising each two skeleton members in spaced relationship, each of said members having V-shaped ends, the members of the V's being connected by bars, there being formed at the opposing flanks of each member tubular bosses, bolts passing through said bosses, nuts on said bolts which when tightened will securely fasten the two members together, there being bearings at the apexes of the V's, the outer members of said skeleton frames being straight, the inner members being offset at one end, the driving mechanism for the traction means being located at the latter end, there being notches in the lower margins of the skeleton frames, and clamping plates bolted below said notches, non-rotating axles mounted in said notches and track wheels rotatably mounted on said axles to run on the lower stretch of said traction means.

20. In a motor driven vehicle, the combination, of a chassis, a motor mounted on said chassis, traction means at each side of said chassis, said traction means including trucks constructed to support said chassis, endless track bands mounted in said trucks, sprocket wheels mounted in said trucks over which said endless track bands are trained, and means for rotating one of said sprocket wheels in each truck, said means including a worm-gear case, a worm rotatably connected to said motor, a worm wheel in each casing, said worm wheels meshing with said worms, said worm wheels being each mounted on a sleeve together with a sprocket wheel, said sleeves being rotatably mounted upon non-rotating axles fixed in said trucks.

21. In a motor driven vehicle, a truck frame, comprising two skeleton members in parallel spaced relationship, there being at one end of said truck frames tubular bosses, a non-rotating axle secured in said bosses, a sleeve rotatably mounted on said axle, a sprocket wheel secured to said sleeve, a gear case mounted on said sleeve, a worm wheel on said sleeve, a worm in said casing meshing with said worm wheel, and means for rotating said worm.

In testimony that I claim the foregoing as my invention, I have hereunto set my hand.

ORLEY C. HOUGHTON.